Patented Feb. 19, 1935

1,991,885

UNITED STATES PATENT OFFICE 1,991,885

DYESTUFFS OF THE NAPHTHOQUINONE SERIES

George Holland Ellis, Henry Charles Olpin, and Ernest William Kirk, Spondon, near Derby, England, assignors to Celanese Corporation of America, a corporation of Delaware No Drawing. Application July 20, 1929, Serial No. 379,874. In Great Britain August 1, 1928

9 Claims. (Cl. 260—56)

This invention relates to the manufacture of new nitrogenous colouring matters of the naphthalene series and the application thereof, more particularly to threads, yarns, knitted or woven fabrics, or other products made of or containing cellulose acetate or other organic acid esters of cellulose, such for example as cellulose formate, propionate, or butyrate, or the product obtained by the treatment of alkalized cellulose with esterifying agents (e. g. the product known as "immunized cotton" obtained by the use of p-toluenesulpho-chloride), or made of or containing cellulose ethers, such as methyl, ethyl, or benzyl cellulose, or the corresponding condensation products of cellulose and glycols or other polyhydric alcohols, all of which are hereinafter referred to as organic substitution derivatives of cellulose.

The new colouring matters may also be applied to textile materials generally, for example, to animal fibres, vegetable fibres, or artificial silks of the regenerated cellulose type.

According to this invention 5,8-dihydroxy-1,4-naphthoquinone (naphthazarin) or nuclear substitution products thereof are converted into colouring matters containing nitrogen by the action of ammonia or a substance yielding ammonia. The naphthazarin or the derivatives thereof may be employed either as such or in the form of their reduction products.

The reaction may be carried out at ordinary or raised pressures and in the presence or not of solvents or diluents or of substances having a catalytic action, for example copper salts e. g. cupric acetate. Thus the reaction may be effected by heating naphthazarin or a derivative thereof with concentrated or comparatively concentrated aqueous ammonia or with alcoholic ammonia, for example in an autoclave.

As referred to above the naphthazarin or derivatives thereof may be employed for the condensation in the form of their reduction products. It is not necessary however to isolate the reduction products or even to prepare them by a separate operation; a reducing agent for example sodium hydrosulphite, may simply be added to the reaction mixture containing the naphthazarin or its substitution derivative and ammonia. Where reduction products of naphthazarin have been employed or a reducing agent has been added to the reaction mixture the colouring matters will usually be obtained in the form of solutions of their reduction products from which they may be isolated by treatment with air or other oxidizing agent.

Among the substitution derivatives of naphthazarin which may be employed according to the present invention may be mentioned its hydroxy and alkyl derivatives, for example naphthopurpurin and methyl naphthazarin.

The new colouring matters dye the aforementioned organic substitution derivatives of cellulose for example cellulose acetate, in grey to black shades. For this purpose they may be applied in the reduced state, i. e. by a vat process, or they may be applied in solution, in aqueous suspension, or after being brought into colloidal form.

The compound resulting from the action of ammonia on naphthazarin is a blackish powder giving a reddish blue solution in alcohol, and a reddish brown coloured solution in sulphuric acid, which with the addition of boric acid turns brownish crimson. It yields a brownish yellow vat with alkali and hydrosulphite. The corresponding compounds from derivatives of naphthazarin and ammonia have similar properties.

According to a further feature of the invention the new colouring matters are converted into preparations, whether liquid or solid or semi-solid, in which the colouring matters are present in the reduced or unreduced state and in colloidal, dispersed, or other finely divided condition. Such preparations may be prepared, for example by grinding (e. g. in colloid mills), by dissolving in a solvent and mixing with water containing or not containing protective colloids or dispersators, or by treatment with dispersing agents whether alone or in the presence of protective colloids and/or liquids e. g. water. Preparations intended for vatting may contain reducing agents, alkali or the like, e. g. alkali salts of hydroxy and polyhydroxy cyclic compounds (see U. S. Patent No. 1,716,720). As dispersing agents particular mention may be made of those described in U. S. Patents Nos. 1,618,413, 1,618,414, 1,694,413, 1,716,721 and 1,840,572; viz. bodies of oily or fatty characteristics, namely higher fatty acids or sulphonated or other derivatives thereof containing salt-forming groups, such as sulphoricinoleic acid or other sulphonated fatty acids or salts of such acids or bodies, for instance their alkali or ammonium salts; carbocyclic compounds containing in their structure one or more salt forming groups or salts of such compounds; sulpho-aromatic fatty acids or salts thereof; and soluble resin soaps or sodium or other soluble salts of resin acids. The dispersing agents may be used alone or in conjunction with auxiliary solvents, as described in Patents Nos. 1,690,481 and 1,803,008.

By dilution with water the aforesaid preparations containing unreduced colouring matters yield aqueous suspensions or colloidal solutions which may be directly employed for the colouration of cellulose acetate or other organic substitution derivatives of cellulose. The preparations containing reduced or unreduced colouring matters may be employed for the preparation of dye vats for the colouration of cellulose acetate or other organic substitution derivatives of cellulose or other textile materials.

The following examples illustrate the invention but are not to be regarded as in any way limitative.

Example 1

400 grams of a 20% aqueous suspension of naphthazarin, 600 ccs. of methylated spirits, and 300 ccs. of 25% ammonia solution are mixed together at 50° C. and sodium hydrosulphite added until the blue solution has changed to a clear yellow. The solution thus obtained is stirred at 50–60° C. with exclusion of air for 48 hours. The mixture thus obtained is poured into 1 litre of water, and air passed through for several hours, whereby the leuco compound of the naphthoquinone derivative becomes oxidized and separates out of solution, and is filtered and washed, being then ready for use. The product thus obtained dyes cellulose acetate in grey shades.

Example 2

1000 grams of 20% naphthazarin paste, 1000 ccs. of water, and 120 grams of caustic soda are mixed together and heated to 70° C. Sufficient sodium hydrosulphite is added to obtain a clear yellow colouration, and to the resulting solution of leuco naphthazarin is added 1000 grams of ammonia solution (25%) and a trace of copper acetate. This mixture is heated in a closed vessel for 6 hours at 130–140° C. and after cooling, air is passed in to oxidize and thus isolate the resulting naphthoquinone derivative, which is then filtered off, washed and pressed. The product thus obtained dyes violet grey shades on cellulose acetate.

Example 3

500 grams of a 10% paste of monomethyl naphthazarin, 2-methyl-1,4-dihydroxy-5,8-naphthaquinone, is added to 1000 grams of 25% ammonia solution containing a trace of a copper salt, sufficient sodium hydrosulphite added to effect reduction to the leuco body, and the mixture stirred at 50–60° C. for seven days. Air is then passed in, and the oxidized product filtered, washed and pressed. The product dyes cellulose acetate similar shades to that obtained according to Example 2.

What we claim and desire to secure by Letters Patent is:—

1. Method of preparing nitrogenous coloring matters comprising acting on a compound selected from the group consisting of naphthazarin and its hydroxy and alkyl derivatives with ammonia.

2. Method of preparing nitrogenous coloring matters comprising acting on a compound selected from the group consisting of naphthazarin and its hydroxy and alkyl derivatives in reduced form with ammonia.

3. Method of preparing nitrogenous coloring matters comprising reducing a compound selected from the group consisting of naphthazarin and its hydroxy and alkyl derivatives, heating with ammonia, and oxidizing in the same solution without isolating any intermediate product.

4. Method of preparing nitrogenous coloring matters comprising acting on a compound selected from the group consisting of naphthazarin and its hydroxy and alkyl derivatives with ammonia in the presence of a salt of copper.

5. Method of preparing nitrogenous coloring matters comprising acting on a compound selected from the group consisting of naphthazarin and its hydroxy and alkyl derivatives in reduced form with ammonia in the presence of a salt of copper.

6. As new products, coloring matters obtainable by the action of ammonia on compounds selected from the group consisting of naphthazarin and its hydroxy and alkyl derivatives.

7. Method of preparing nitrogenous coloring matters comprising acting on a 5,8-dihydroxy-1,4-naphthoquinone with ammonia.

8. Method of preparing nitrogenous coloring matters comprising acting on a 5,8-dihydroxy-1,4-naphthoquinone in reduced form with ammonia.

9. As a new product a coloring matter obtainable by the action of ammonia on a 5,8-dihydroxy-1,4-naphthoquinone.

GEORGE HOLLAND ELLIS.
HENRY CHARLES OLPIN.
ERNEST WILLIAM KIRK.